Figure 1:
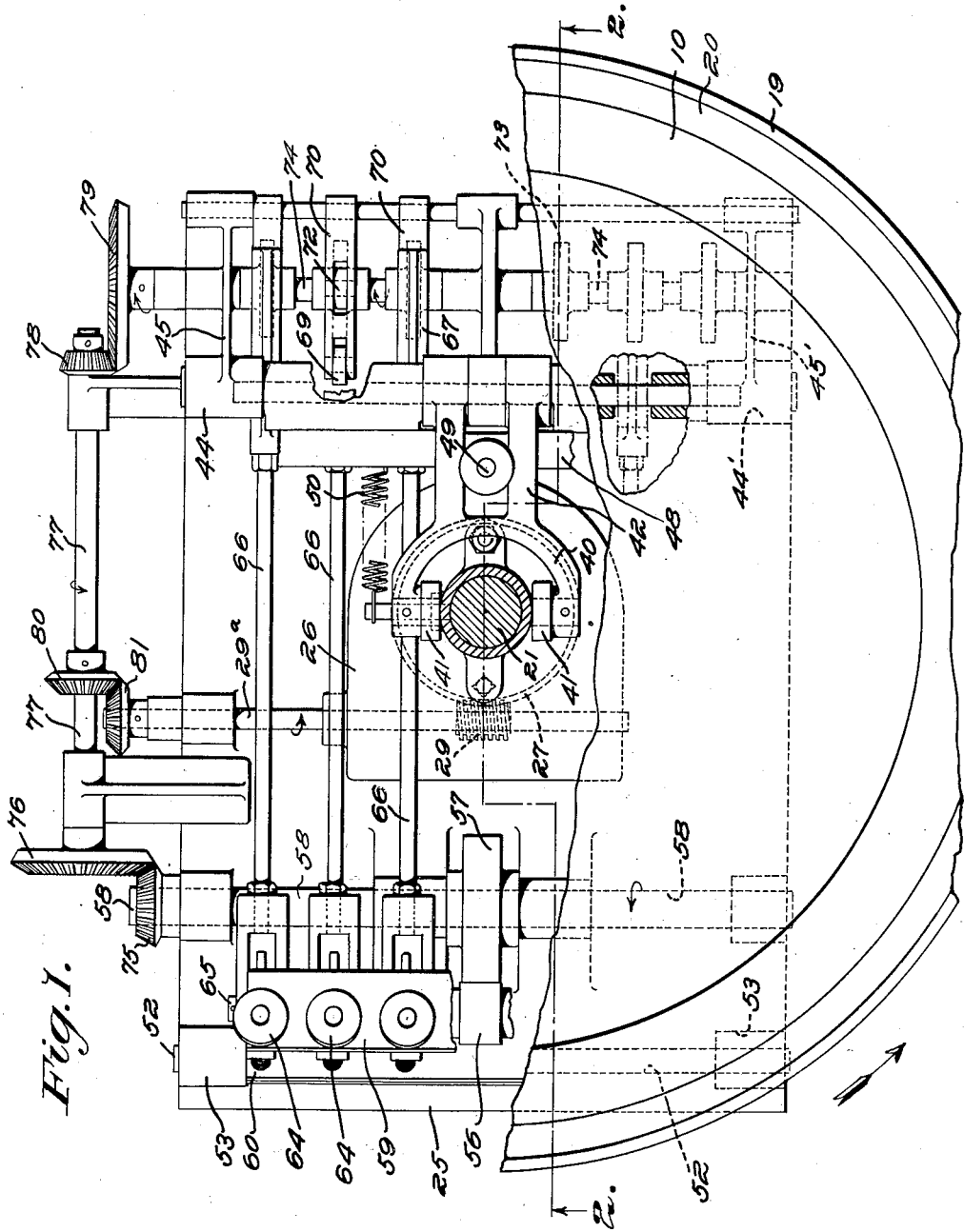

June 21, 1932.   K. E. PEILER   1,864,495
GATHERING POOL
Filed Feb. 6, 1929   2 Sheets-Sheet 1

Witness:
S. S. Grotta

Inventor:
Karl E. Peiler
by Robt. D. Brown
Attorney.

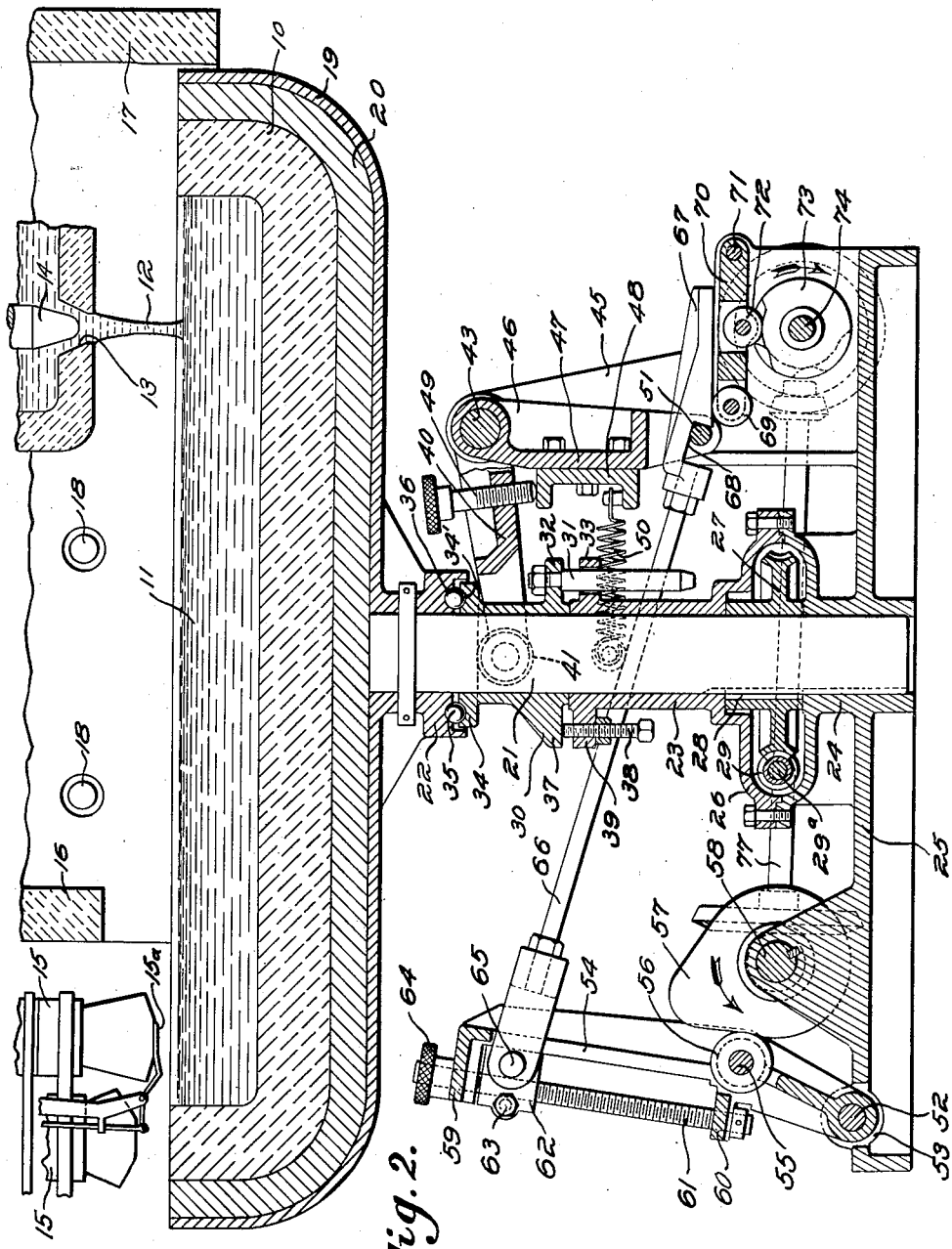

Patented June 21, 1932

1,864,495

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

GATHERING POOL

Application filed February 6, 1929. Serial No. 337,940.

My invention relates to the art of gathering molten glass by the suction method. More particularly it provides a method and apparatus for presenting to suction gathering molds or cups a supply or bath of molten glass in suitable condition for gathering, and provides novel and efficient means for selectively presenting such supply either to molds of the same length or to molds of different lengths.

In gathering molten glass by suction gathering mechanism from a bath or pool, it is essential not only that the glass be maintained in a proper heated condition for gathering and that the glass be supplied under suitable control to replenish the glass withdrawn from the bath, but the effective level of the glass at the time of its presentation to each mold or cup must be properly controlled in order to effect the immersion of the lower end of the mold or cup into the bath to the desired extent. In order to maintain the glass in desired condition at the gathering point, a gathering pool in the form of a cylindrical revolving pot is generally used. Glass is supplied to the revolving pot from a melting furnace by flowing the glass through a spout from the furnace into the pot. The glass in the pot is kept hot by fuel supplied to a fire space enclosed by a cover which extends over a greater portion of the pot. A portion of the pot projects beyond the cover, so as to expose portions of the glass surface to give access to suction molds or other gathering receptacles. The exposed portion of the glass is not only chilled by its exposure, but also by the chill caused by contact of the suction molds or receptacles and of the shears which are customarily employed to sever the gathered mold charges from the glass bath in the pot.

The revolving of the pot brings the chilled portion of the glass under the cover where it is subjected to heat and reheated to the desired consistency. It also presents a fresh, properly heated portion of glass in a projecting portion of the pot, for gathering by the succeeding mold or receptacle. The level of the glass in the pot is generally regulated by means of an adjustable gate or valve in the flow spout from the melting furnace to the revolving pot. It has heretofore been generally the practice to provide a rotary pot for use in conjunction with each suction gathering forming machine, which machines are normally provided with a plurality of suction gathering molds and mold units which are successively presented at the gathering point and dipped into the glass. Heretofore the suction gathering molds of these units have been of approximately the same length and capacity and this has heretofore been considered essential, as the proper collection of the charge is in part dependent upon dipping the several molds into the bath to approximately the same extent. Much effort has been put forth to assure the maintenance of a constant level in the tank to assure this constant dip by the similar molds. Heretofore and for various reasons, it has been the practice to provide a pot of considerable area and to provide a forming machine having a considerable number of similar suction gathering molds for use therewith. Because of these and other factors, the suction gathering method has been economical only when used to supply large orders of glassware of the same size and shape.

In the usual operation of the suction gathering devices, the suction gathering molds or receptacles are brought, by the revolution of a table or carrier upon which they are mounted, over the edge of the revolving gathering pot, and are then dipped or lowered to the proper extent to immerse the lower end of the mold into the bath.

It has been proposed in the United States patent to Graves and Whittemore No. 914,823 to maintain the molds at a fixed level when they arrive over a gathering pool and instead of dipping the molds to reciprocate the pot containing the pool of glass to effect the desired immersion of the molds in the glass. The Graves and Whittemore patent contemplates the use of molds of the same size upon the several units of the suction gathering machine and contemplates the intermittent rotation and the periodic reciprocation of the gathering pool, and also the intermittent rotation of the gathering device.

I propose to provide a suitable rotary gathering pot provided with mechanism for continuously rotating the pot about a vertical axis for the purposes above described and to also impart to the pot and hence to the level of the glass, a variable and controlled rise and fall in suitable synchronism with the operations of the presentation of gathering devices, whereby the apparatus may be selectively used either to supply a plurality of molds of the same length and capacity or to supply molds of different lengths and capacities presented at the gathering point in any desired, cyclic order. I provide suitable mechanism for rotating the pot and for imparting vertical reciprocation thereto and provide these means with suitable adjusting and regulating means which permit a wide variety of uses of the mechanism. By the use of this mechanism, I provide a novel method of supplying glass in selected order in regular cycles to a plurality of differently sized molds and thus make possible the manufacture of ware of different weights and shapes by a single forming machine. Other advantages and features of novelty embodied in the device of my invention and the methods of using it will be apparent from the following specification, when considered in connection with the accompanying drawings, in which:

Figure 1 is a plan view of a gathering pot and its operating mechanism embodying my invention, certain parts of the structure being broken away to more clearly show the mechanism below it; and Fig. 2 is a vertical section taken on the line 2—2 of Fig. 1.

Generally speaking, I provide a rotary pot mounted for rotation about a vertical axis and for vertical reciprocation. For imparting reciprocation to the pot, I provide a bell crank and a plurality of actuating mechanisms therefor which operate the crank to selected extents in a predetermined but variable order to raise the pot to selected different heights in a selected order. The pot is mounted adjacent a suitable melting tank from which it is supplied through a spout or forehearth with a constant supply of glass of the proper viscosity at a controlled rate. The spout and the greater portion of the pot are covered in by a suitable cover and the space under the cover is properly heated by controlled heating means to maintain the glass at the desired temperature and condition and to recondition the glass chilled by passing into and being operated upon in the gathering zone. A suitable suction gathering bottle forming machine, preferably but not necessarily of the turret type, is mounted adjacent to the gathering pot. Such machine comprises a plurality of suction mold units, which are successively presented above the gathering zone of the pot in regular cyclic order. The pot is continuously rotated and is raised and lowered in synchronism with the presentation of the successive molds at the gathering zone to effect the immersion of the lowered ends of the molds in the glass to the desired uniform extent. A gather is effected in each mold during such immersion by the creation of a vacuum in the mold, after which the pot is lowered and the glass connecting that in the mold with the supply is severed.

As stated, the pot of my invention is designed to operate with a machine supplied with molds of the same size, in which event the apparatus may be so set and adjusted that the pot will rise to the same extent upon each reciprocation or the apparatus may be operated to aid in the formation of articles of different sizes upon the same machine, in which event the extent of rise of the pot will be varied to present the glass at different levels, each suitable to the particular mold which is to be filled.

Referring more particularly to the drawings, the numeral 10 represents a refractory pot of generally cylindrical form designed to contain a bath of glass 11 to which glass is constantly supplied by a stream 12 flowing from a melting furnace (not shown) through an outlet 13 at a rate controlled by an adjustable gate or valve 14. The gathering mechanism and forming machine, as a whole, is indicated by the suction molds 15 and shears 15a, there being a plurality of such molds which may be of different lengths, as shown, and shears and suitable operating mechanism therefor mounted upon the table or spider of the forming machine. A suitable cover indicated by the front wall thereof 16 and an overhanging back wall 17 is provided to cover in the greater portion of the bath 11 and the spout or forehearth from which the glass is supplied. The space under this cover may be heated to maintain the glass at the proper temperature, as by burners 18.

The refractory pot 10 is carried by a metallic holder 19 and is insulated therefrom by suitable insulation 20, this insulation not only protecting the holder 19 from the intense heat of the glass, but aiding in the maintenance of the proper heat condition of the lower strata of the glass in the bath 11. The pot is supported upon a large vertical shaft 21 held in a depending cylindrical portion 22 of the holder 19. The shaft 21 is mounted for rotation and for vertical sliding movement in the tubular members 23 and 24, the latter of which is formed integral with a suitable base 25 and which together form an enlarged bearing for the shaft and which carry a suitable drive housing 26. Within the housing 26 is a worm wheel 27 keyed as at 28 to the shaft 21 and meshing with a suitable worm 29 on a shaft 29a which is adapted to be driven constantly to impart rotary movement to the shaft and the pot.

Between the depending portion 22 and the member 23 is a collar 30 surrounding the shaft 21 and adapted for vertical movement, but restrained against rotary movement by a pin 31 journaled in a bracket 32 integral with the collar 30 and extending through an opening in an extension or ear 33 of the member 23. The collar 30 is provided with an enlarged head 34, the upper surface of which is provided with ball race 34' carrying ball bearings 35 which also run in suitable upper ball races 36 formed on the lower surface of the depending portion 22 of the holder 19, thus providing a bearing to take the upward thrust of the rotary drive. The collar 30 is provided with a lower flanged portion 37 which forms a stop or abutment against which bear adjusting screws 38 which are carried by suitable ears 39 of the member 23. The position of these screws may be varied to determine the extent of fall of the pot on each reciprocation thereof.

The pot is periodically raised through the following mechanism. The collar 30 is embraced below its upper flange 34 by the arms of a yoke 40 which carry suitable rolls 41 adapted to engage the lower surface of the flange 34. The yoke is carried by a lever arm 42 which is pivoted at its end opposite the yoke upon a shaft 43 which is journaled in suitable bearings 44 and 44' in brackets 45 and 45' arising from the base 25. The shaft 43 also serves as the pivot for a lever 46 which, as shown, comprises a plurality of depending arms 47 joined by a suitable web structure. Upon the web is mounted a suitable stop bracket 48 whose upper surface is designed to contact with an adjusting screw 49 screwed through the lever arm 42. A spring 50 is connected to the lever 46 and to the member 23 and holds the bracket 48 in bearing relation to the screw 49. Thus the lever arms 42 and 46 form in effect a one-way driving means, as through a bell crank lever. The lower end of the lever 46 carries a rod or shaft 51, to which power is applied by the means hereinafter described to move the arm 46 to the left, as shown in Fig. 2, to effect the upward movement of the pot.

The mechanism for moving the lever arms 46 and 42 to reciprocate the pot, comprises a plurality of levers and associated links (six being shown), a cam for actuating all the levers, and cams individual to the several levers for selectively connecting the levers with the arm 46. A suitable shaft 52, journaled in bearings 53 arising from the base 25, serves as a pivot for six levers 54. These levers are connected by a shaft 55 which passes through each lever at a point between its pivot and its opposite end. The shaft 55 carries a cam roll 56 adapted to run on the periphery of a cam 57 which is keyed on a shaft 58, which shaft is driven through mechanism hereinafter described in proper timed relation to the movements of the suction gathering device. Each lever 54 is provided with projecting ears 59 and 60 in which a screw 61 is journaled.

A split block 62 provided with a clamping bolt 63 is threaded on the screw 61. The arrangement is such that by loosening the bolt 63 and turning the screw 61 by means of its thumb nut 64, the position of the block 62 on the screw 61 may be varied. The block 62 carries a pivot 65 for one end of a link 66, the other end of which carries a head 67 provided with a notch 68 designed to slip over the rod 51 to form a driving connection between the levers 54 and 46. The head 67 of each link 66 extends above and presents a flat surface to a roll 69 mounted in one end of a lever 70, the opposite end of which is pivoted, as at 71, on a suitable bracket arising from the base 25. Intermediate the pivots 71 and the roll 69, each lever 70 carries a cam roll 72 designed to run upon the periphery of a cam 73 mounted on a cam shaft 74 and designed to be driven by the mechanism hereinafter described. Each of the cams 73, of which there is one for each link 66, is so shaped as to provide a concentric portion which maintains the roll 72 and the end of its link 66 out of engagement with the rod 51 and with a second concentric portion, which permits the notch 68 of the link 66 to engage the part 51. The cam is also provided with suitably shaped portions between these two concentric portions adapted to cause the notch 68 to engage and disengage the shaft 51. The several cams 73 are mounted upon the shaft 74 in the desired phase relation and the shaft 74 is driven at such speed relative to the shaft 58 that, if desired, the notches 68 of the several links 66 will successively engage the shaft 51, whereby the throw of the levers 46 and 40 will be successively effected by the several levers 54. The extent of throw of the bell crank 40—46 by each of these levers may be regulated by adjustment of the block 62 on its screw 61. Thus the effective length of each lever arm 54 may be varied. This adjustment is individual to each lever 54 and hence in the device shown, as many as six different upward movements of the pot may be effected. By varying the position of the screw 49, the extent of the throw effected by all of the levers 54 may be varied.

The mechanism described is designed to operate in suitable time relation with the suction gathering device. To this end, the shaft 58 may be driven from the gathering device by means (not shown) but preferably at a speed, which is to the speed of rotation of the suction gathering device as the number of suction mold units on that device is to one. Thus the cam 57 makes a complete rotation for each presentation of a mold at the gathering zone, and as each revolution of this cam causes the rise of the pot through one or more of the levers 54 and links 66, the pot is caused to rise once for each presentation of a suction mold. The shaft 58 carries at its outer end a beveled gear 75, which is designed to mesh with a beveled gear 76 mounted on one end of cross shaft 77, the opposite end of which carries a beveled gear 78 adapted to mesh with a beveled gear 79 mounted on the end of the cam shaft 74. The gearing connecting the shafts 58 and 74 is such that the shaft 58 rotates six times for each revolution of the shaft 74 in the particular embodiment shown. The shaft 77 also carries a beveled gear 80 which meshes with a beveled bear 81 on the end of the shaft 29a and by this means the worm 29 is rotated to cause rotation of the shaft 21 and of the pot.

It is readily seen from the construction above described that suitable means have been provided for constantly rotating the pot about its vertical axis, together with adjustable means for giving the pot a variable rise and fall. The extent of successive rises may be regulated and varied within wide limits by the adjustment of the positions of the blocks 62 of the links 66, and thus the pot may be moved to cooperate with successive molds of different types. These successive rises of the pot when selected and set by the proper positioning of the several blocks 62 may be collectively modified by the use of the adjusting screw 49 which changes the angle between the levers 40 and 46. Thus a change in the depth of glass in the pot may be compensated. The lower position of the pot may be varied by the use of the adjustment screws 38 as heretofore pointed out. This permits use of different bottle machines requiring different clearances. The cams 73 may be set in any desired phase relation and may be given any desired contour. Thus the reciprocation of the pot may be effected through the cooperation with the bar 51 of any or all of the links 66. If the operation of the gathering device be such that molds of the same length are used on all its units, it is obviously desirable that the rise of the pot should be of the same for each mold. This may readily be accomplished by setting all of the blocks 62 at the same position relative to the levers 54. If during such an operation the level of the glass in the pot should vary or if for any other reason the extent of immersion of the molds is not that desired, this condition may be corrected by regulation of the screw 49.

If desired, the several levers 54 may be provided with arcuate slots replacing the screws 61 and in these slots a suitable pivot block similar to the block 62 may be mounted and adapted to be moved to various positions in the slot and clamped in those positions. This arrangement may be particularly desirable in an embodiment of my apparatus in which it would seem desirable to use relatively short links 66. In any event, it would prove desirable that the curvature of the arcuate slot be approximately that of an arc struck from the axis of the rod 51 when the pot is in the lower position.

As my invention is particularly useful in the practice of a method novel in the suction gathering art, namely, that of gathering charges of different weight by the several molds or receptacles of the gathering device, I will describe the operation of the device to perform that novel method.

Assuming a suitable bath of glass of proper temperature and viscosity in the pot and a suitably regulated constant supply for such bath through the opening 13 and the proper heat regulation by the burners 18. The pot is continuously rotated by the application of power through the worm 29, worm wheel 27 and shaft 21. The rotary gathering device is rotated preferably at a continuous and constant speed and periodically presents each of a succession of molds 15 above the gathering zone of the pot. We will assume for the sake of simplicity, but not by way of limitation, that there are six suction molds mounted upon the machine at regular spaced intervals around the periphery thereof and that each of these molds is of a different length and designed to collect a charge for a different sized bottle.

The levels at which the glass immerses the molds to the same extent having been determined, the positions of the blocks 62 of the links 66 are properly adjusted and the cams 73 so set that the pot will be successively raised through power applied through the successive levers 54 and their links 66 in the proper order. As the cam shaft 58 is driven at a speed six times that of the gathering device, the pot is caused to rise and fall once for each presentation of a mold 15 and as each rise and fall is effected through a different lever 54 and link 66, the extent of the successive rises is different and is such as is best suited for the different successively presented molds. The cam shaft 74 is rotated at a speed one-sixth of that of the shaft 58. The cams 73 may be similar but are set 60° apart to cause the desired successive control of the reciprocation through the successive links 66.

It is obvious that by suitable settings and adjustments of the mechanism, two or more of the links 66 may be made to coact to cause a single reciprocation of the pot and that the mechanism may thus be made to raise and lower the pot to supply glass to a wide variety of combinations of molds upon the gathering device.

My invention is not limited to the particular structure shown, but is capable of numerous modifications within the scope of my invention as set forth in the appended claims.

I claim:

1. In combination with a suction gathering device, a glass gathering pot, means for rotating the pot, and means for raising and lowering the pot and for varying the height to which the pot is raised in successive movements thereof.

2. In combination with a suction gathering device, a gathering pot, means for rotating the pot, and means for raising and lowering the pot to raise the surface of the glass therein to different levels varying in a regular cyclic order.

3. A glass gathering pot for use with a suction gathering device, employing gathering receptacles of different length which comprises, a container for the glass, means for rotating the container about a vertical axis, and means for successively raising and lowering the container to successively present the surface of the glass at varying levels adapted to the different lengths of the several gathering receptacles.

4. In combination with a suction gathering device provided with a plurality of suction gathering receptacles of different sizes and successively presented to a gathering position, a rotary gathering pot, means for continuously supplying glass thereto, means for heating the glass in the pot, and means for raising and lowering the pot and glass to varying extents in a regular cyclic order and in synchronism with the presentation of the gathering receptacles at the gathering point.

5. In combination with a suction gathering device having a plurality of gathering molds of different lengths, a glass gathering pot, means for continuously rotating the pot about a vertical axis, means for raising and lowering the pot, and automatic mechanical means associated with said last-named means for raising and lowering the pot to immerse the lower ends of the receptacles in the glass to a uniform extent at different levels.

6. A glass gathering pot for use with a suction gathering device which comprises, a container for the glass, means for supplying glass thereto, means for rotating the pot about a vertical axis, a lever for raising and lowering the pot, a plurality of sets of similar links and levers for moving the first named lever, and means for adjusting the effective length of the last named levers to vary the throw of the first named lever.

7. In combination with a suction gathering device having a plurality of gathering receptacles, a glass gathering pot, means for rotating the pot about a vertical axis, a cam for periodically causing vertical reciprocation of the pot, and a plurality of means, all actuated by said cam, for successively imparting reciprocating movements of varying extent to the pot.

8. In combination with a suction gathering device, a plurality of suction gathering receptacles, a gathering pot, means for rotating the gathering pot about a vertical axis, a bell crank lever for vertically reciprocating the pot, and means for varying the angle between the arms of the lever to varying the extent of such reciprocation.

9. In combination with a suction gathering device employing a plurality of gathering receptacles of different sizes, a gathering pot, means for rotating the pot about a vertical axis, and means for vertically reciprocating the pot to varying extents said means comprising a lever, a cam, a plurality of driving members mounted between the cam and the lever, and means for connecting and disconnecting said driving members to said lever in a predetermined order.

10. In combination with a suction gathering device employing a plurality of gathering receptacles of different sizes, a gathering pot, means for rotating the pot about a vertical axis, means for vertically reciprocating the pot to varying extents, said means comprising a lever, a cam, a plurality of driving members mounted between the cam and the lever, means for connecting and disconnecting said driving members to said lever in a predetermined order, and means for variably regulating the extent of throw of the lever by the operation of each of said connections.

11. In the art of gathering mold charges by suction, the steps of successively presenting at a gathering position above a bath of glass a series of suction gathering receptacles, the bottoms of which are at varying levels, periodically raising the surface of the glass to varying levels to immerse the successive receptacles in the glass to a uniform extent, and collecting a mold charge by suction in each of said receptacles.

12. The process of gathering mold charges of molten glass by suction which comprises, establishing a bath of glass in an upwardly facing pot, rotating the pot about a vertical axis, successively presenting at a gathering position above the pot a succession of suction gathering receptacles of varying lengths, raising and lowering the pot for each presentation of a mold, and regulating the extent of the several reciprocations of the pot to immerse the lower ends of the molds in the bath to substantially the same extent at different levels, creating a vacuum in each of the molds while immersed to collect a charge of glass therein, and severing the glass connecting that in the molds with that in the pot upon each lowering of the pot.

Signed at Hartford, Connecticut, this 29th day of January, 1929.

KARL E. PEILER.